United States Patent
Fredericksen et al.

(10) Patent No.: US 7,174,827 B2
(45) Date of Patent: Feb. 13, 2007

(54) MOUNTING CLIP FOR THRUST BEARING

(75) Inventors: Arnold E. Fredericksen, New Hartford, CT (US); Kenneth B. Whitecross, Harwinton, CT (US); Gregory C. Piotrowski, North Canton, OH (US)

(73) Assignee: Timken US Corporation, Torrington, CT (US)

( * ) Notice: Subject to any disclaimer, the term of this patent is extended or adjusted under 35 U.S.C. 154(b) by 249 days.

(21) Appl. No.: 10/494,978

(22) PCT Filed: Nov. 7, 2002

(86) PCT No.: PCT/US02/35760

§ 371 (c)(1),
(2), (4) Date: Aug. 20, 2004

(87) PCT Pub. No.: WO03/040560

PCT Pub. Date: May 15, 2003

(65) Prior Publication Data
US 2005/0008501 A1 Jan. 13, 2005

Related U.S. Application Data

(60) Provisional application No. 60/337,757, filed on Nov. 7, 2001, provisional application No. 60/353,417, filed on Feb. 1, 2002.

(51) Int. Cl.
*F01B 13/04* (2006.01)

(52) U.S. Cl. .................. 92/12.2; 92/57; 92/71; 417/269

(58) Field of Classification Search ............ 92/12.2, 92/57, 71; 417/269
See application file for complete search history.

(56) References Cited

U.S. PATENT DOCUMENTS

| | | | | | |
|---|---|---|---|---|---|
| 4,042,309 | A | * | 8/1977 | Hiraga | 417/269 |
| 4,046,432 | A | * | 9/1977 | Hofmann et al. | 384/510 |
| 4,266,913 | A | * | 5/1981 | Nomura | 417/269 |
| 5,533,871 | A | * | 7/1996 | Takenaka et al. | 417/269 |
| 5,752,809 | A | * | 5/1998 | Makino et al. | 417/269 |
| 5,937,735 | A | * | 8/1999 | Shimizu et al. | 92/153 |
| 5,950,520 | A | * | 9/1999 | Kurosawa | 92/12.2 |
| 6,517,321 | B1 | * | 2/2003 | Takenaka et al. | 417/222.1 |

* cited by examiner

*Primary Examiner*—Hoang Nguyen
(74) *Attorney, Agent, or Firm*—Michael Best & Friedrich LLP

(57) ABSTRACT

A compressor assembly comprising a housing having a shaft bore therein, a main shaft positioned for rotation within the shaft bore, at least one roller thrust bearing and a thurst surface bearing clip. The thrust surface bearing clip comprises a first position configured for fixed engagement with the housing and a second portion extending from the first portion and configured for supporting a thurst surface in a position spaced from the rotating shaft, the thrust surface providing a bearing surface for the roller thrust bearing.

6 Claims, 7 Drawing Sheets

MOUNTING CLIP FOR THRUST BEARING

RELATED APPLICATIONS

This application is a 371 of PCT/US02/35760 filed Nov. 7, 2002, which claims the benefit of U.S. Provisional Patent Application 60/337,757 filed Nov. 7, 2001, and U.S. Provisional Patent Application 60/353,417 filed Feb. 1, 2002.

BACKGROUND

The present invention relates to thrust bearings. More particularly, the present invention relates to piloting arrangements for thrust bearing washers. The invention lends itself to use in current swashplate air conditioning compressors, but may be applied in compressors of various types and configurations.

The current practice in swashplate air conditioning compressors uses thrust washers on each side of thrust bearings that are piloted on a compressor main shaft. An example of a fixed displacement compressor of this type is illustrated in section in FIGS. 1 and 2.

Referring to FIG. 1, the compressor generally comprises a main shaft 10, piston connecting portion 14, piston end portions 16, half ball shoes 18, radially loaded roller bearings 20 and 22, thrust washers 24 and 26, roller thrust bearings 28, and swashplate 30 positioned within a housing 50. FIG. 2 is a plan view of an illustrative compressor housing 50 with which the present invention is utilized. The housing 50 includes a face 52 with a shaft bore 54, a plurality of fluid passages 56 and a plurality of piston cylinder bores 58.

As can be seen in FIG. 1, the thrust washers 24 and 26 are piloted off of the main shaft 10. The piloting of the thrust washers 24 and 26 on the compressor main shaft 10 results in relative rotation between the shaft outer diameter and the bore of one of the washers. Special finishing processes for the washer bore (such as fine blanking, for example) are often used in order to prevent excessive wear between the washer bore and the shaft.

The current practice with thrust washers piloted on the main shaft also hinders lubricant from flowing freely to the thrust bearing bore and radially loaded roller bearing. Roller thrust bearings, by their nature, tend to pump lubricant from the bore toward the outer diameter. A clear path under the thrust washer is desired to allow free pumping action of lubricant through the adjacent radially loaded roller bearing and out through the thrust bearing.

SUMMARY

The present invention provides a compressor assembly comprising a housing having a shaft bore therein, a main shaft positioned for rotation within the shaft bore, at least one roller thrust bearing and a thrust surface bearing clip. The thrust surface bearing clip comprises a first portion configured for fixed engagement with the housing and a second portion extending from the first portion and configured for supporting a thrust surface in a position spaced from the rotating shaft, the thrust surface providing a bearing surface for the roller thrust bearing.

In at least one embodiment, the thrust bearing surface is provided by a thrust washer and the second portion includes at least one tab or lip configured to support the thrust washer.

The first portion may include a plurality of housing tabs configured to engage the housing and the second portion includes an annular ring supported by the housing tabs. The annular ring may include an outer surface that defines the thrust bearing surface or may include at least two opposed washer tabs extend from the annular ring opposite the housing tabs with the washer tabs configured to support a thrust washer that defines the thrust bearing surface.

The compressor assembly may further comprise a radial bearing positioned in the shaft bore between the shaft and the housing. In such an embodiment, the radial bearing may include a bearing race with an axial lip extending therefrom such that the bearing race defines the first portion and the axial lip defines the second portion.

In yet another embodiment, the first portion is defined by a cup body press fit in the shaft bore and the second portion is defined by a lip extending from the body.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 1:
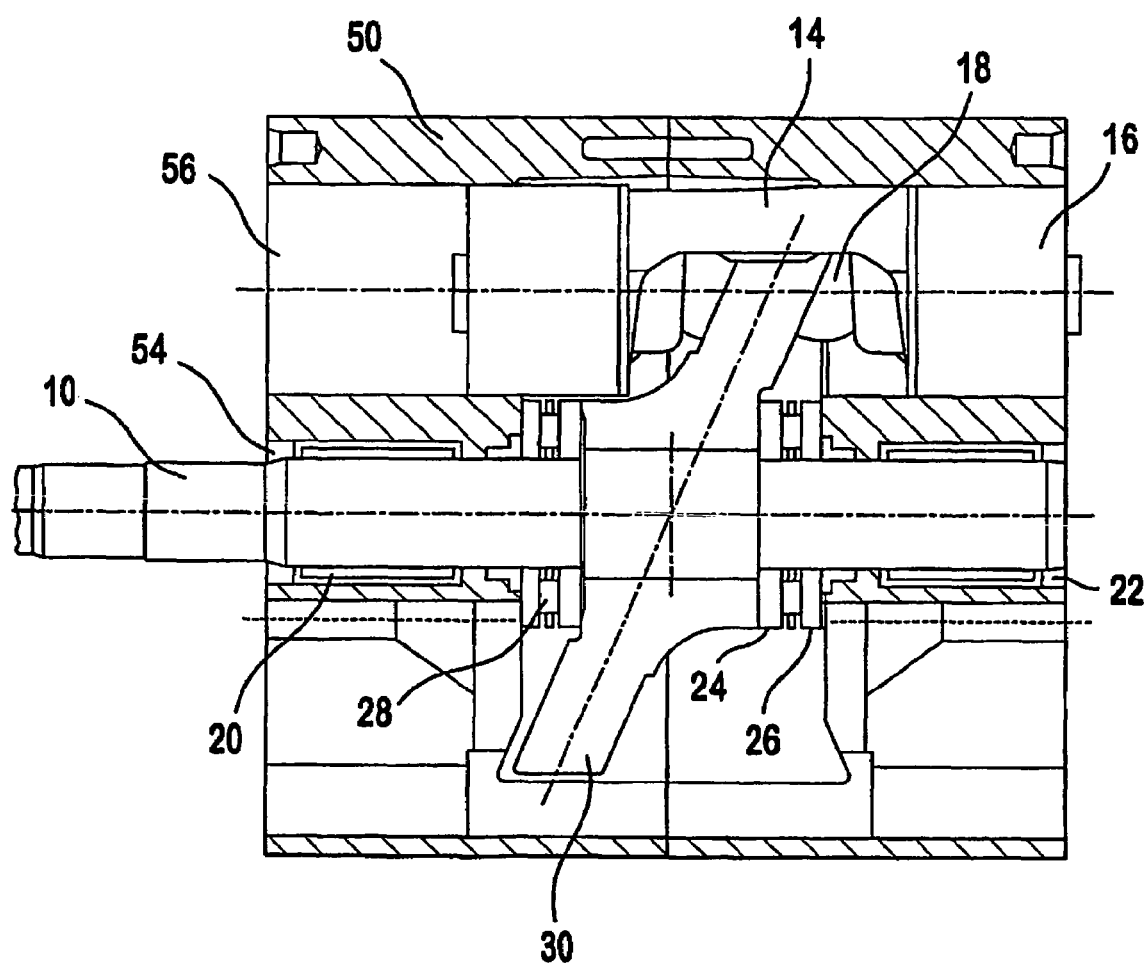
FIG. 1 is a cross-sectional view of a illustrative prior art compressor.
Figure 2:
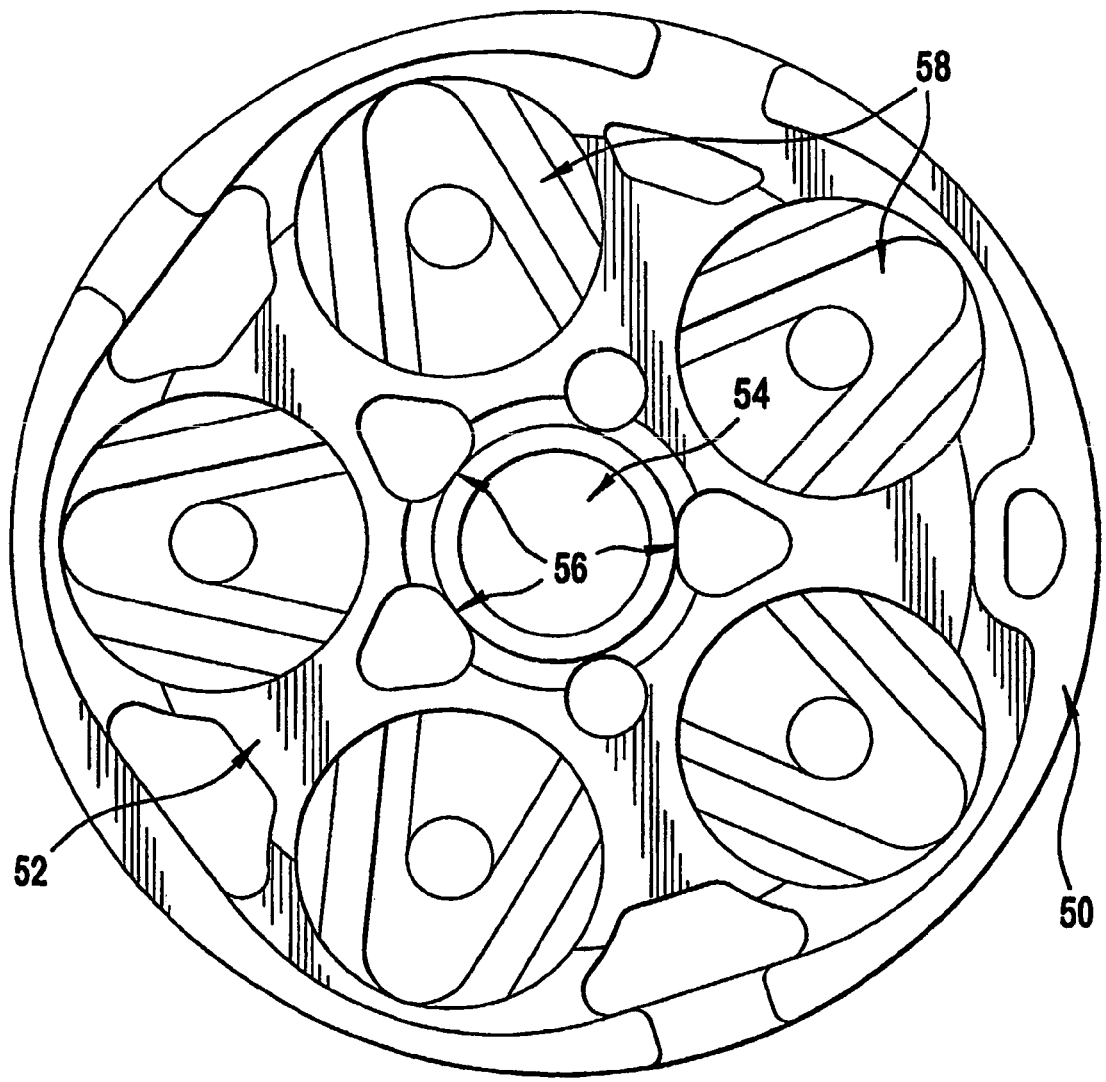
FIG. 2 is a plan view of a portion of an illustrative compressor housing.
Figure 3:
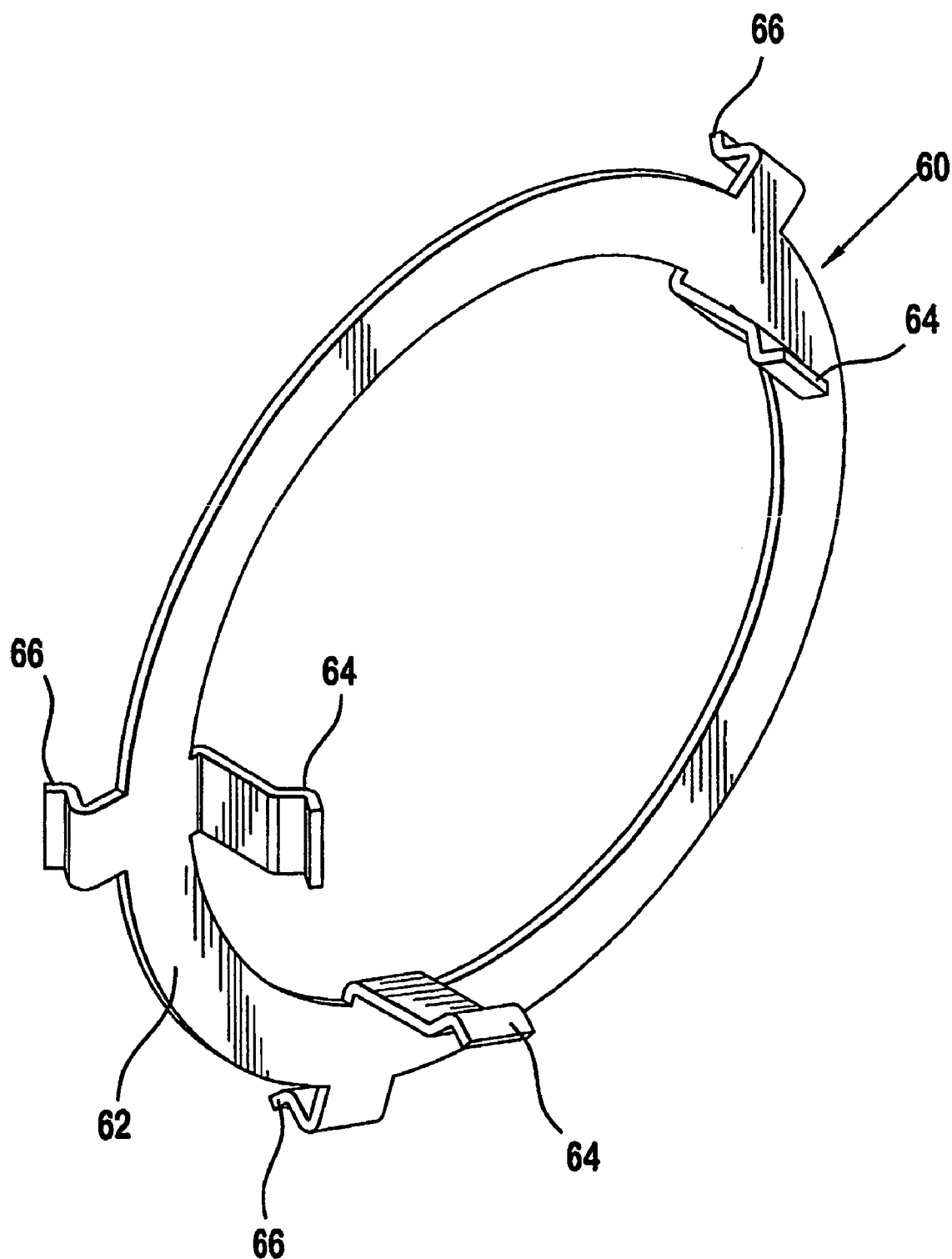
FIG. 3 is an isometric view of a piloting clip of a first embodiment of the present invention.
Figure 4:
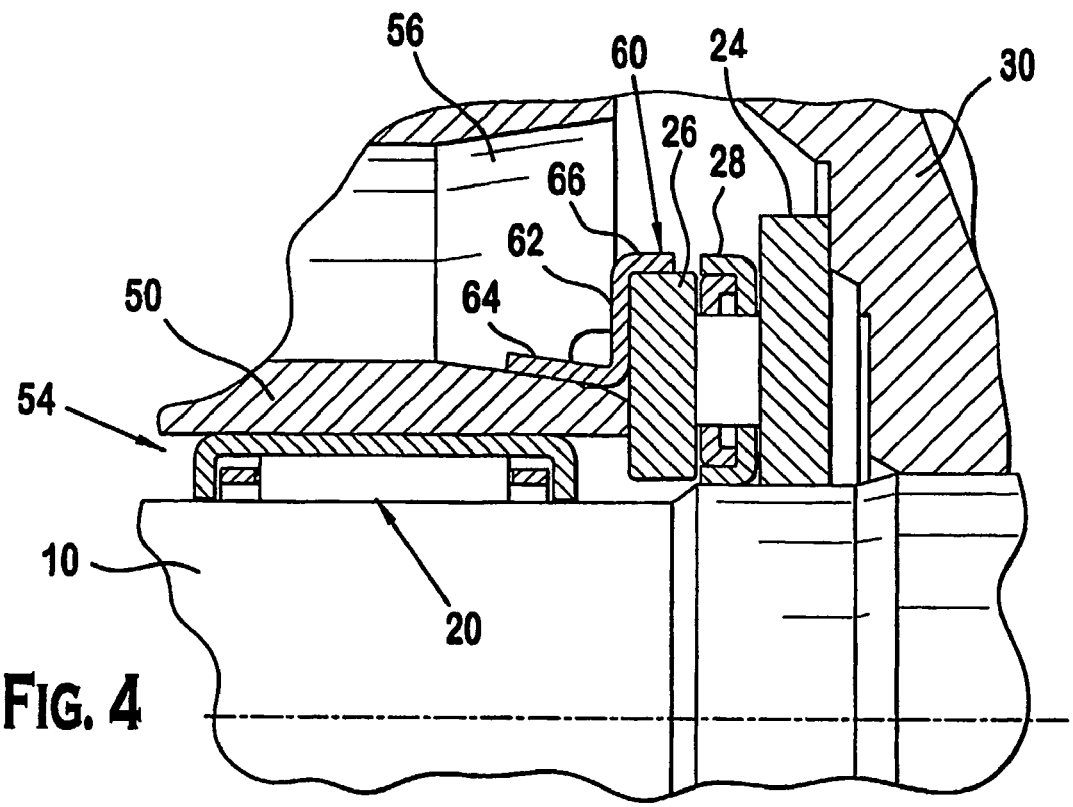
FIG. 4 is a cross-sectional view of a portion of a compressor incorporating the piloting clip of FIG. 3.

Referring to FIGS. 3 and 4, the piloting clip 60 of a first embodiment of the present invention is shown in conjunction with the compressor assembly including the main shaft 10, shaft bore 54, fluid passage 56, radially loaded roller bearing 20, thrust washers 24 and 26, and roller thrust bearing 28. The clip 60 generally comprises a cylindrical hoop 62 with a plurality of housing tabs 64 and a plurality of washer tabs 66. The housing tabs 64 are configured and positioned to snap into respective ones of the fluid passages 56 to thereby rigidly mount the clip 60 to the housing 50. The washer tabs 66 are configured to clasp the inner thrust washer 26. Three of each tab 64, 66 are shown, but more or fewer can be utilized. In such an embodiment, the thrust washer 26 is piloted by the ring 62 and clips 66 and is spaced from and not in bearing contact with the main shaft 10, see FIG. 4, thereby minimizing wear and allowing lubricant passage.

Figure 5:
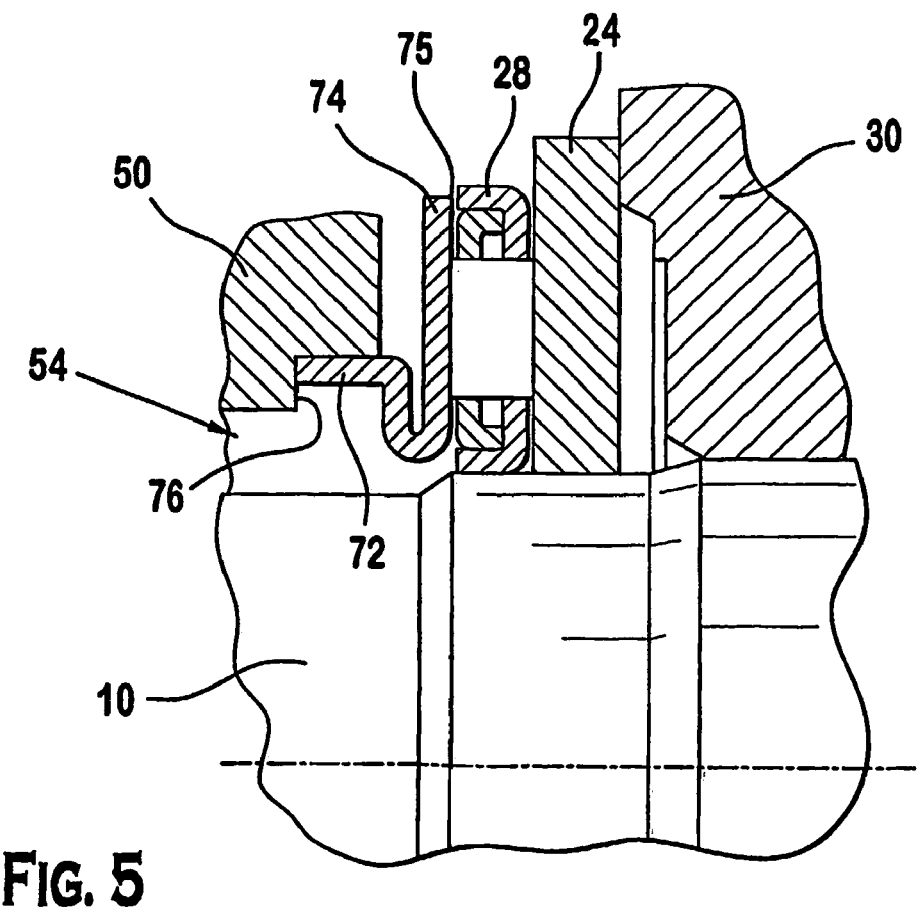
FIG. 5 is a cross-sectional view of a portion of a compressor incorporating a piloting clip included in an alternate embodiment of the invention.
Figure 6:
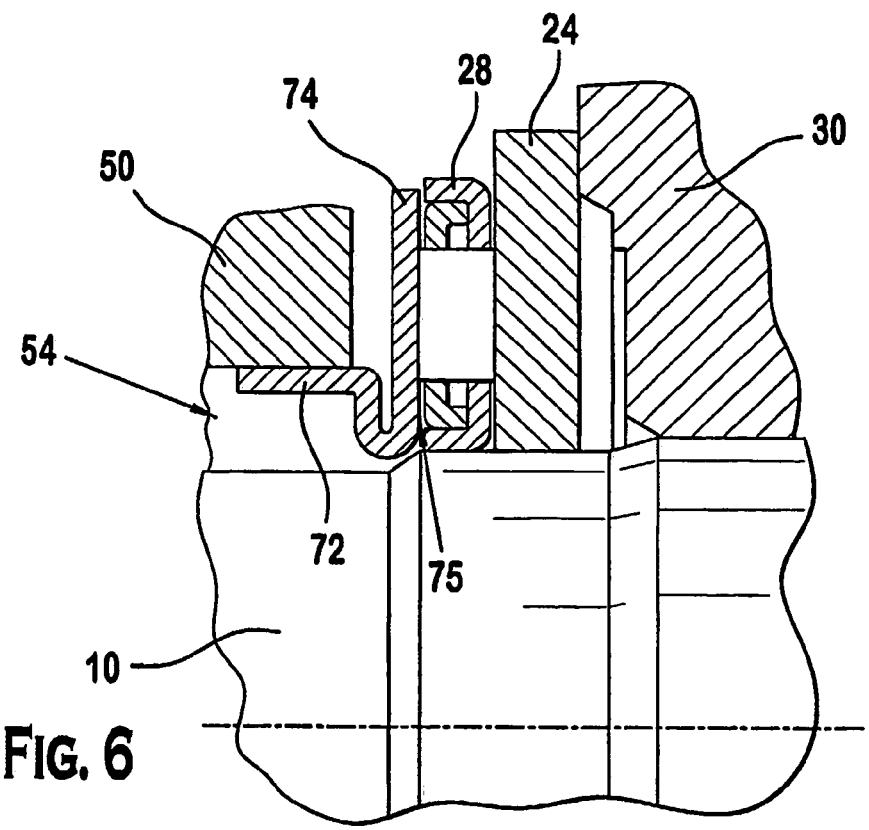
FIG. 6 is a cross-sectional view of a portion of a compressor incorporating a piloting clip included in yet another alternate embodiment of the invention.

Two alternative embodiments of the present invention are illustrated in FIGS. 5 and 6. In each of these embodiments, the washer and clip are combined into a single unit. A plurality of flexible tabs 72 are integral with and extend from the ring 74. The ring 74 outer surface 75 provides a direct bearing surface for the bearing 28. Again, the bearing surface ring 74 is spaced from and not in bearing contact with the main shaft 10. A notch 76 may be machined into the housing face 52 (FIG. 8) for receiving the tabs 72 or the tabs 72 can be received directly in the shaft bore 54 (FIG. 9) or the fluid passages 56.

Figure 7:
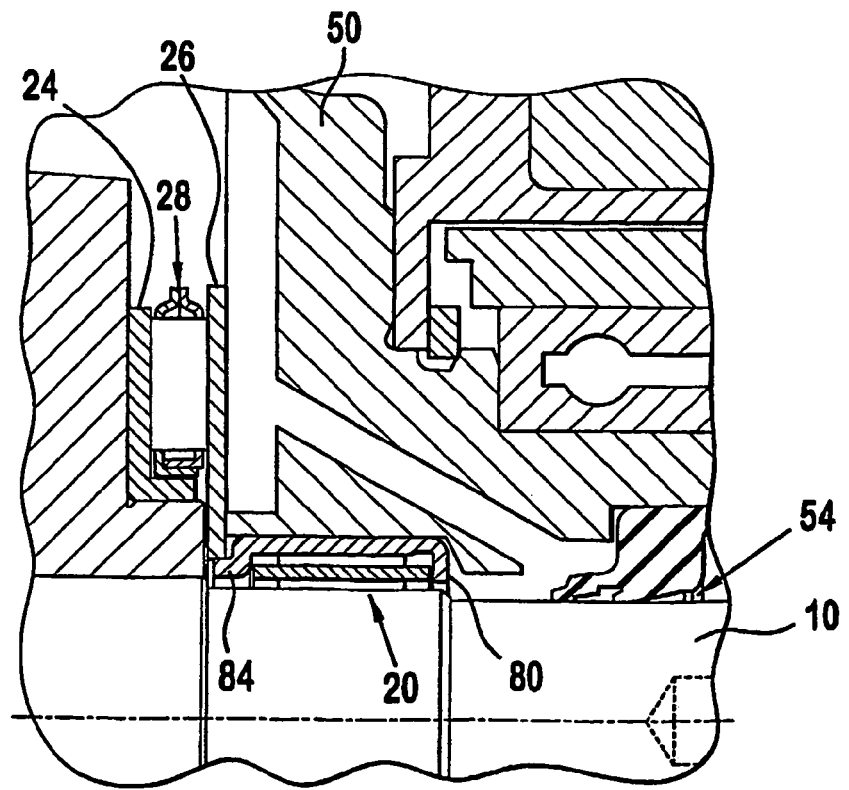
FIGS. 7 and 8 are cross-sectional views of portions at opposite ends of a compressor incorporating a piloting tab included in yet another alternate embodiment of the invention.
Figure 8:
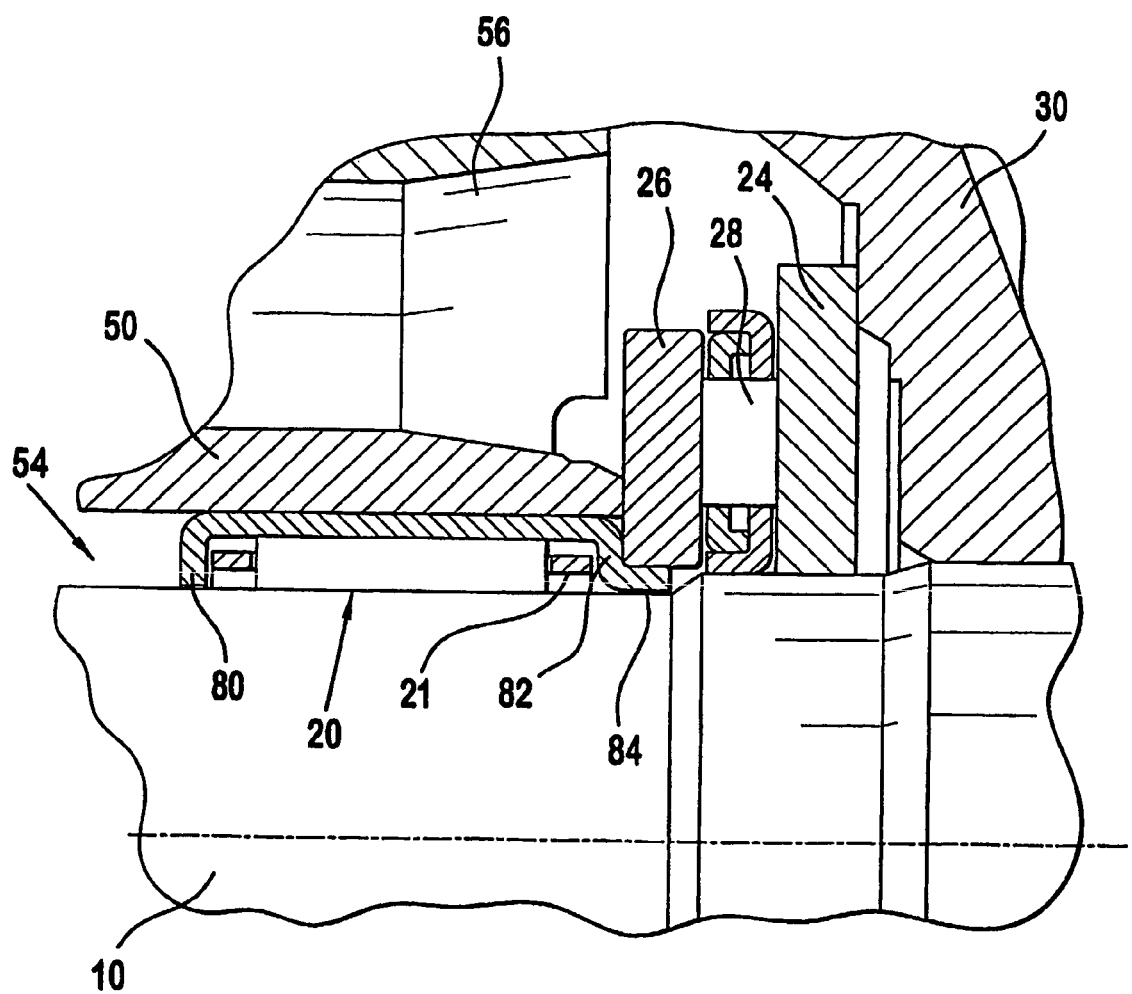

Referring to FIGS. 7 and 8, another alternate embodiment of the present invention is illustrated in use at opposite ends of the compressor. Such embodiment provides an extended lip 84 extending from the race 80 of the radially loaded roller bearing 20. The race 80 is preferably press fit into the cylinder bore 54. The extended cup lip 84 provides a piloting surface for the bore of a thrust washer 26. Again, the washer 26 is maintained spaced from and not in bearing contact with the main shaft 10.

The race 80 may be manufactured as a drawn cup, machined, or alternatively manufactured. The lip 84 need not be annular, but could consist of several tabs or the like. A portion 82 of the extending lip 84 of radially loaded roller bearing 20 is formed as part of a drawn cup outer race 80 and is offset radially inwardly with respect to the cylinder bore 54 to provide a piloting surface for cage 21. Additionally, a plurality of retention bumps (not shown) may be provided on outer diameter of the extended lip of the radially loaded roller bearing to serve as an assembly aid to keep the thrust washer in place on the lip during assembly of the compressor.

Figure 9:
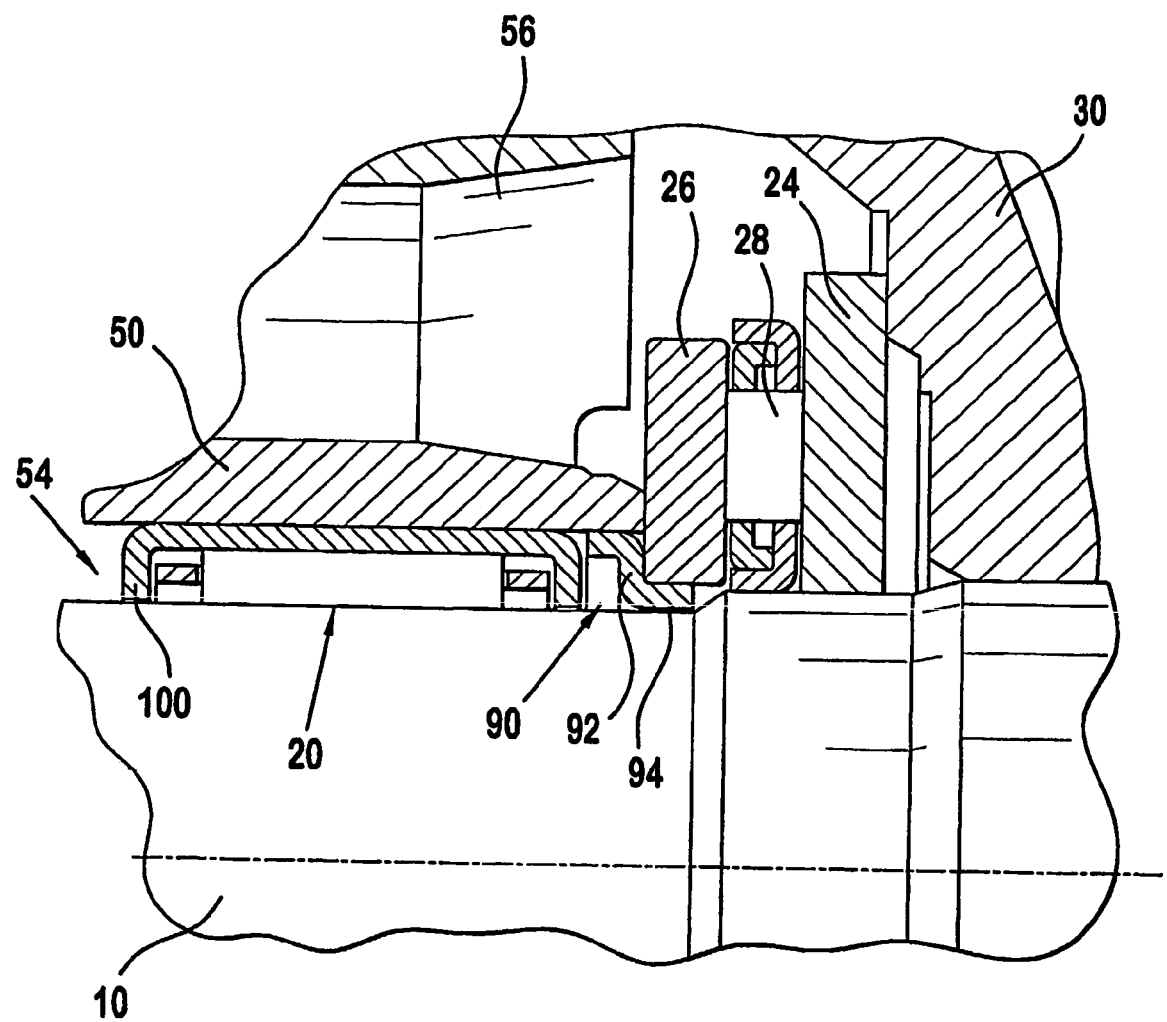
FIG. 9 is cross-sectional view of a portion of a compressor incorporating a piloting tab included in yet another alternate embodiment of the invention.

Referring to FIG. 9, another alternate embodiment of the present invention is illustrated. Such embodiment provides an independent support component 90 that is preferably press fit into the shaft bore 54. The radially loaded bearing 20 includes a drawn cup race 100 or the like, however, such race 100 is separate from the support component 90. The support component 90 includes a body 92 that is maintained in the shaft bore 54 and a support lip 94 extending from the body 92. The lip 94 provides a piloting surface for the bore of a thrust washer 26. Again, the washer 26 is maintained spaced from and not in bearing contact with the main shaft 10. The lip 94 need not be annular, but could consist of several tabs or the like.

What is claimed is:

1. A compressor assembly comprising:
    a housing having at least one bore therein;
    a main shaft positioned for rotation within the bore;
    at least one roller thrust bearing;
    a thrust surface bearing clip comprising:
        a first portion configured for fixed engagement with the housing; and
        a second portion extending from the first portion and configured for supporting a thrust surface in a position spaced from the shaft, the thrust surface providing a bearing surface for the roller thrust bearing; and
    a radial bearing positioned in the shaft bore between the shaft and the housing wherein the radial bearing includes a bearing race with an axial lip extending therefrom, the bearing race defining the first portion and the axial lip defining the second portion.

2. The compressor of claim 1 wherein the lip is an annular lip.

3. The compressor of claim 1 wherein the lip is defined by a plurality of spaced tabs.

4. A compressor assembly comprising:
    a housing having at least one bore therein;
    a main shaft positioned for rotation within the bore;
    at least one roller thrust bearing; and
    a thrust surface bearing clip comprising:
        a first portion configured for fixed engagement with the housing; and
        a second portion extending from the first portion and configured for supporting a thrust surface in a position spaced from the shaft, the thrust surface providing a bearing surface for the roller thrust bearing;
    wherein the first portion is defined by a cup body press fit in the shaft bore and the second portion is defined by a lip extending from the body.

5. The compressor of claim 4 wherein the lip is an annular lip.

6. The compressor of claim 4 wherein the lip is defined by a plurality of spaced tabs.

* * * * *